Feb. 2, 1971  S. DE LAJARTE ET AL  3,560,177
MANUFACTURE OF GLASS FIBERS
Filed April 3, 1968  5 Sheets-Sheet 2
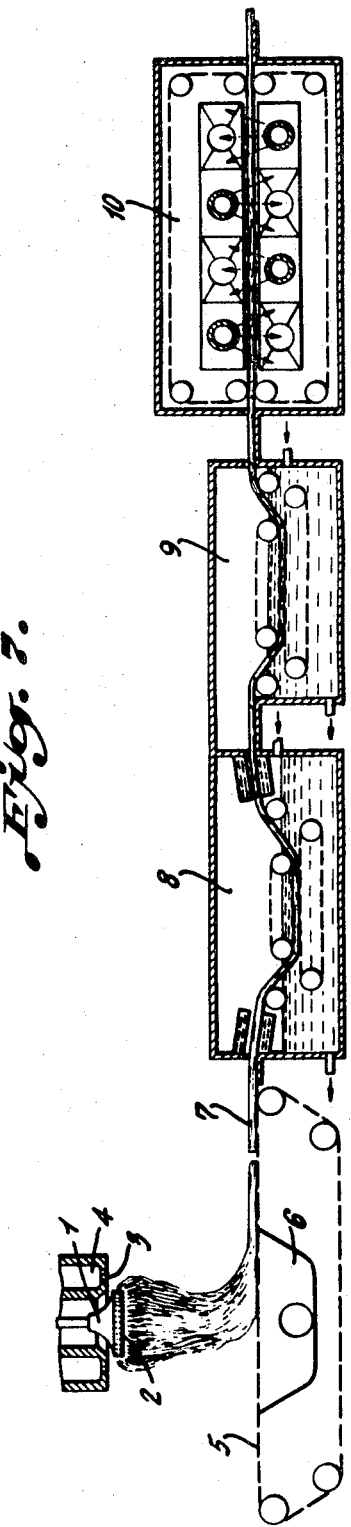
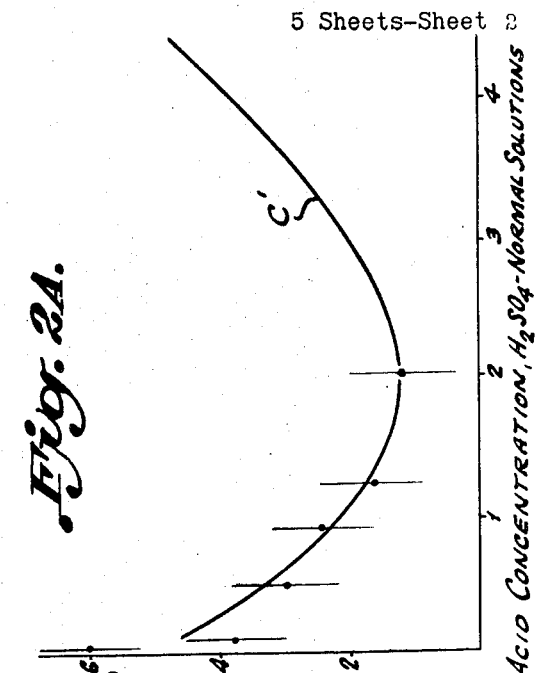
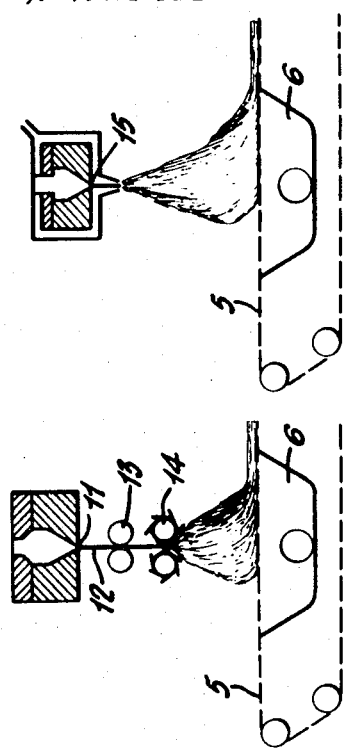
INVENTORS
STÉPHANE DE LAJARTE
JEAN ASOLO

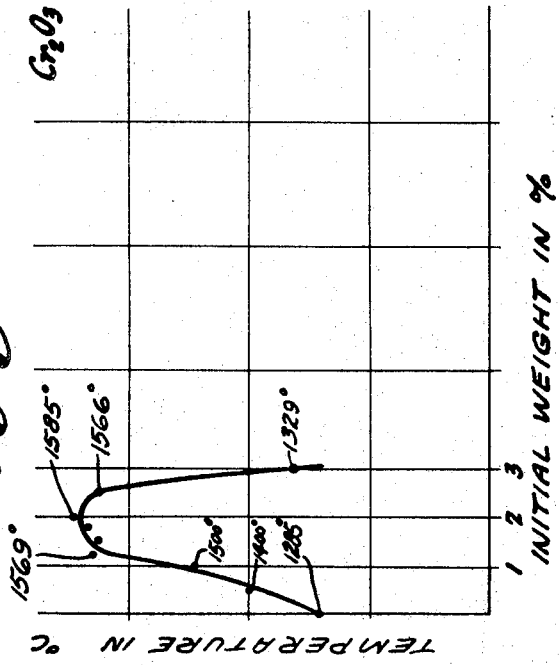
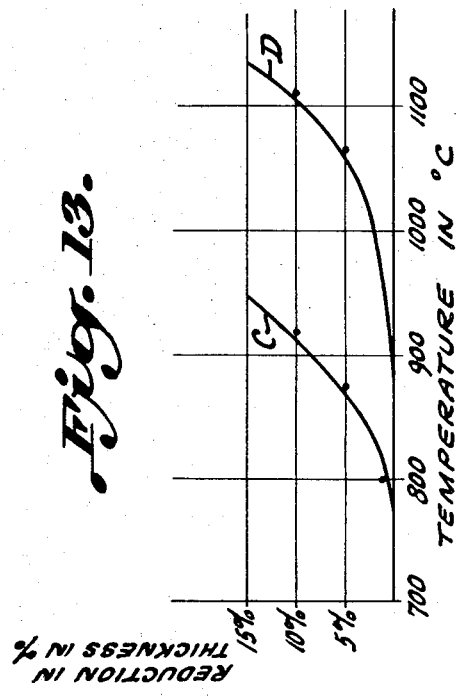
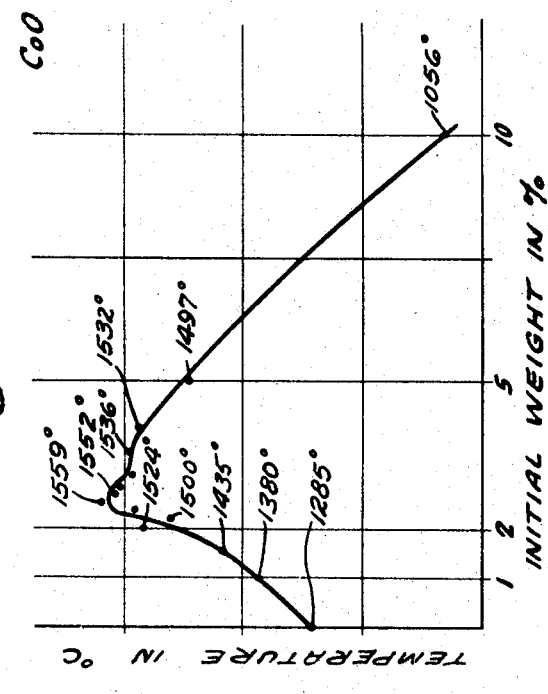
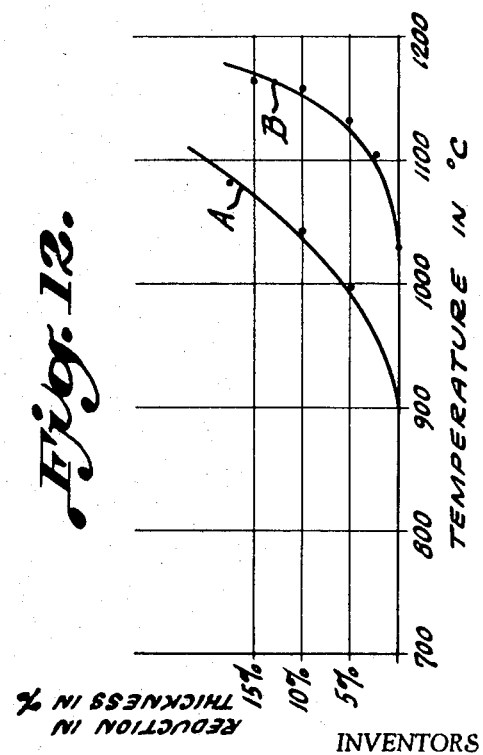

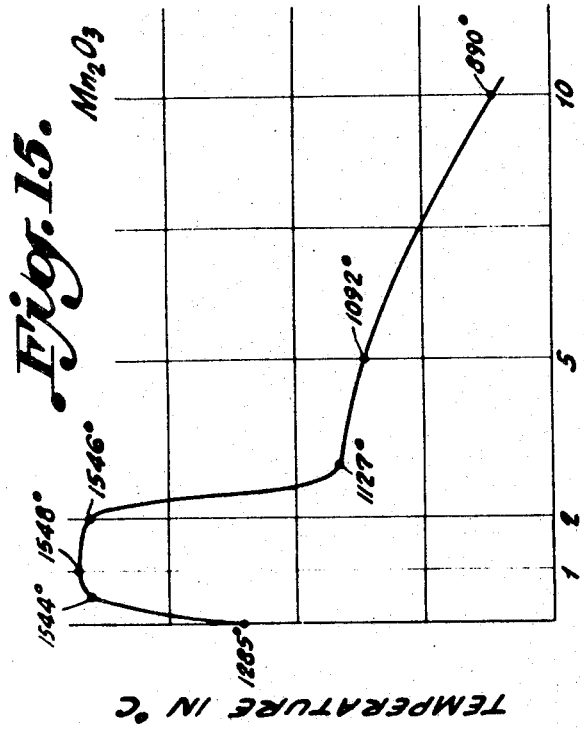
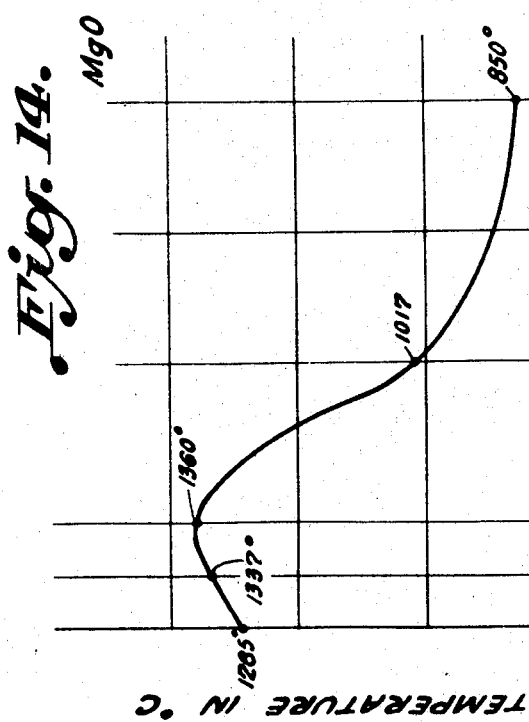
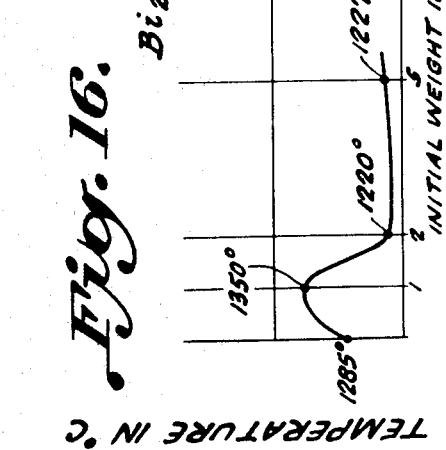

ic Office 3,560,177
Patented Feb. 2, 1971

3,560,177
MANUFACTURE OF GLASS FIBERS
Stéphane de Lajarte, Paris, and Jean Asolo, Les Clayes-sous-Bois, Yvelines, France, assignors to Compagnie de Saint-Gobain, Victor-Hugo, Neuilly-sur-Seine, Seine, France, a corporation of France
Continuation-in-part of application Ser. No. 563,635, July 1, 1966, which is a continuation-in-part of application Ser. No. 208,280, July 9, 1962. This application Apr. 3, 1968, Ser. No. 724,675
Claims priority, application France, Dec. 27, 1961, 883,117
Int. Cl. C03c 25/06
U.S. Cl. 65—3   8 Claims

ABSTRACT OF THE DISCLOSURE

The continuous production of a mat of glass fibers having high temperature-resistant characteristics is made possible by the formation of the mat from freshly made fibers, exceeding one micron in diameter, of a glass composition having a predetermined content of silica and alkali oxide, ranging from 66% to 73% of the former, and 34% to 27% of the latter, with less than 5% of stabilizing metallic oxides of the divalent and trivalent groups, so that when the freshly formed mat is passed through an aqueous mineral acid leaching bath immediately following its formation, the mat of fibers is transformed to one essentially of silica in the course of a period no longer than three minutes.

---

This application is a continuation-in-part of our application Ser. No. 563,635, filed July 1, 1966 (now abandoned), which in turn is a continuation-in-part of our application Ser. No. 208,280, filed July 9, 1962 (now abandoned).

This invention relates to the manufacture of glass fibers.

It is the object of the present invention to manufacture glass fibers which may be utilized without danger of physical or chemical change up to temperatures of the order of 1200° C.

The invention is particularly concerned with products obtained by the manufacturing process of high output capacity in which the melted glass is projected in the form of threads or filaments through orifices provided in the periphery of a rotating body, these filaments then being drawn out into fibers whose mean diameter may be between one and ten microns. These products, for example pads or mats of interlaced glass fibers designed for insulation, treated by the process according to the invention, may be utilized within a range of temperatures impossible with present fibers, the practical limit of utilization of which does not extend beyond 750° C.

It is known that certain glasses, and in particular, those constituted of combinations of silica and alkali oxides, may lose a greater or less part of their alkaline constituents when they are subjected to leaching in relatively concentrated acid solutions or in certain salt solutions. It is also known that when these glasses are in the form of fibers of small diameter, from 0.01 to 1 micron, the de-alkalinization can be almost complete, and may be obtained within a few minutes' time. On the other hand, when it is desired to apply these treatments to fibers of one to ten microns in diameter, made of glass compositions, it has been established that the periods required to obtain sufficient de-alkalinization are much longer. The known treatments applied to such fibers then become impractical for industrial manufacture, particularly, continuous manufacture. They would lead, in fact, to the use of treatment vats of absolutely prohibitive sizes, and of considerable quantities of reagents.

The present invention permits the obtention of glass fibers which may contain more than 98% silica and less than 0.5% alkalis by means of rapid leaching, i.e., in about one to three minutes. These fibers are resistant to high temperatures which may reach 1200° C.

The process according to the invention consists in utilizing glasses whose essential constituents are silica and one or several alkali oxides and containing less than 5% metal oxides of the divalent and trivalent groups, designated generally by the name of stabilizing oxides; in subjecting the fibers obtained from these glasses to a heat treatment in an acid bath, the concentration of which is near normal or lower than normal up to 0.2 N; and then washing the fibers. The washing may be followed by a roasting or calcination, preferably at a temperature between 600° C. and 800° C., in order to eliminate the water retained by the fibers during treatment.

Advantageously, the temperature of the bath treatment is between 75° C. to 100° C., or higher if the operation is effected under pressure.

It has been established, and this constitutes an important characteristic of the invention, that it is particularly advantageous to utilize glasses containing 27% to 34% $Na_2O$ and from 66% to 73% $SiO_2$, and preferably from 29% to 31% $Na_2O$ and from 69% to 71% $SiO_2$. Also, the inclusion of certain metallic oxides of the di-valent and tri-valent groups, makes possible the obtaining of fibers which, after leaching, present a particularly high heat resistance.

According to the invention, there is added to the composition, comprising silica and the alkaline oxides, oxides selected from among the following, in the proportions indicated:

$Bi_2O_3$—0.20 to 2% and preferably 0.50 to 1%
CoO—0.50 to 5% and preferably 2 to 5%
$Cr_2O_3$—0.10 to 3% and preferably 1.25 to 2.75%
MgO—0.50 to 3% and preferably 0.50 to 2.50%
NiO—0.50 to 1.25% and preferably 0.50 to 1%
$Mn_2O_3$—0.20 to 2.25% and preferably 0.50 to 2%
PbO—0.20 to 1.50% and preferably 0.50 to 1.5%

The fibers obtained from these compositions are subjected to a heat treatment in an acid bath whose concentration may range between 1.3 N and 0.2 N, then washed and eventually calcined at a temperature between 600 and 1200° C. in order to eliminate the water fixed to the fibers in the course of their treatment.

This leaching treatment results in fibers which contain only very small quantities of alkalis. On the other hand, this leaching causes only partial solubility of the above-mentioned di-valent and tri-valent metallic oxides. This solubility may be very slight in the case of oxides such as oxides of manganese, cobalt, chrome, and nickel. These oxides remaining in the final vitreous systems impart particularly advantageous properties to the fibers, particularly from the point of view of heat resistance, as indicated above.

After leaching, the finished products contain the following percentages of selected oxides in the following scale:

$Bi_2O_3$—0.20 to 3% and preferably 0.50 to 1.50%
CoO—0.50 to 8% and preferably 3 to 8%
$Cr_2O_3$—0.10 to 5% and preferably 1.50 to 4%
MgO—0.20 to 3% and preferably 0.20 to 2.50%
$Mn_2O_3$—0.20 to 3.25% and preferably 0.20 to 2.75%
NiO—0.50 to 2% and preferably 0.50 to 1.50%
PbO—0.10 to 2.25% and preferably 0.50 to 2%

It will be noted that while the finished products contain no more than slight traces of alkali, the concentration of the oxide which was introduced may be greater than in the initial glass composition, if the solubility of the oxide which is used is low.

Particularly interesting results have been obtained, according to the invention, with glasses for which the molecular ratio $SiO_2/Na_2O$ is between 2 and 3, and preferably between 2.3 and 2.5.

Although the glasses, the essential constituents of which are $SiO_2$ and $Na_2O$, are perfectly suitable for the process of the invention, and are recommended since they appeal as being the most economical materials, it is understood that other alkali oxides, and particularly $K_2O$ can be substituted molecularly, entirely or in part, for the sodium oxide without departing from the spirit of the invention.

The de-alkalinization bath may be constituted of aqueous solutions of hydrochloric acid or of other aqueous mineral acid solutions, such as nitric and sulfuric acid solutions, and particularly solutions of sulphuric acid, the remaining concentrations being, of course, within the characteristic limits of the invention.

The choice of compositions and the conditions of treatment correspond to the requirements of the processes utilized for the manufacture of fibers, to the speed of de-alkalinization, to the quality, and to the mechanical resistance or strength of the fibers.

Thus it is, that in the manufacturing process of fibers by centrifuging, and particularly when rotary metallic bodies are utilized for this centrifuging, it is advantageous in order to obtain maximum longevity of the devices to operate them at the lowest possible temperatures compatible with the absence of the formation of devitrified glass, which would have as a consequence the rapid closing or blocking up of the projection orifices of the glass filaments. If, on the other hand, it is recognized that the viscosity of the glass at the moment of fiberizing must be of the order of 1000 poises or slightly higher, it is obvious that the greater the deviation between the temperature corresponding to this viscosity of 1000 poises and the higher temperature to which the glass must be raised to avoid devitrification thereof, the greater will be increased the margin of safety for the fiberizing operation.

In the drawings, FIGS. 1 to 6 are a plurality of charts prepared from experimental data relative to the manufacture of glass fibers of different compositions and modes of treatment to portray optimum conditions of manufacture in accordance with the instant invention.

FIG. 7 is a longitudinal sectional view of an installation for producing mats of glass fibers in accordance with the instant invention;

FIGS. 8 and 9 illustrate two different embodiments of devices for producing the glass fibers at the left end of the installation shown in FIG. 7;

FIGS. 10 and 11 are graphs showing the tractive resistance of glass fibers subjected to heat as a function of varying percentages of the oxides of cobalt and chrome, respectively;

FIGS. 12 and 13 show comparative curves of the improved heat resistance of mats produced from fibers in accordance with the instant invention, especially in resistance to crushing or loss in thickness at high temperatures; and FIGS. 14 to 16 are graphs showing the tractive resistance of glass fibers subjected to heat as a function of varying percentages of the oxides of magnesium, manganese, and bismuth, respectively.

Figure 1:
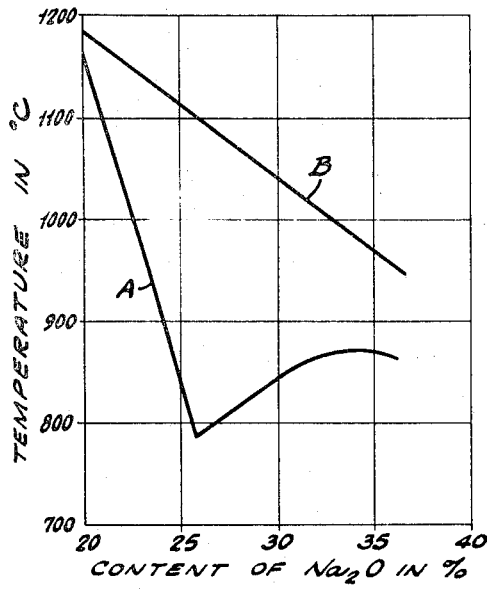

In FIG. 1 is shown the liquidus temperature curve A of glass compositions having different contents of $Na_2O$. The liquidus temperature of a glass represents a limiting temperature above which devitrification cannot occur. Curve B represents differences in temperatures of glass compositions containing different contents of $Na_2O$ to maintain a uniform viscosity of 1000 poises. This figure shows that the margin of safety for fiberization is at a maximum when the $Na_2O$ content is near 26%, but it is still satisfactory when the $Na_2O$ content is up to 34%.

Figure 2:
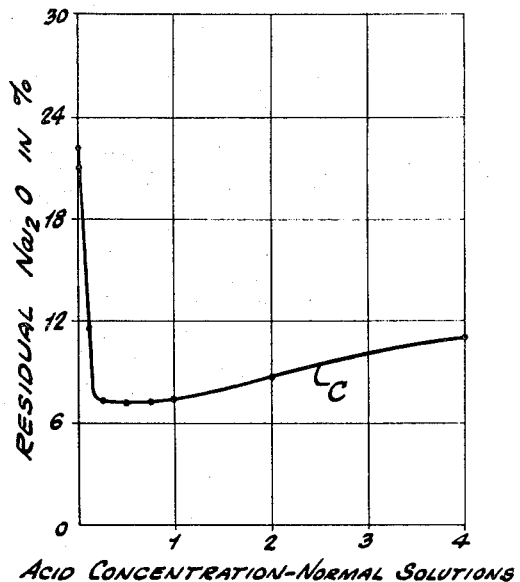

FIG. 2 shows the effect of the concentration of an aqueous solution of hydrochloric acid on the degree of de-alkalinizatin obtained, that is, the percentage of $Na_2O$ remaining in the fibers after an immersion interval of determined duration in the bath treatment at 75° C. temperature. Curve C of this figure was made following tests made on glass fibers of ten micron diameter whose initial composition was 71% $SiO_2$ and 29% $Na_2O$, and by subjecting these fibers to a thirty second treatment.

This curve shows the surprising de-alkalinization effect obtained when the concentration of hydrochloric acid was between about .2 N and 1 N.

FIG. 2A (sheet 3), shows the effect of the leaching of a mat of glass fibers of identical composition to that tested and shown in FIG. 2 (71% of $SiO_2$ and 29% $Na_2O$) with aqueous solutions of sulfuric acid of different concentrations, ranging from 0.04 to 5.0 normal. The greater degree of de-alkalinization evidenced by curve C' in this figure relative to curve C in FIG. 2 may be explained by the fact that the leaching in sulfuric acid was executed at 100° C. for a period of one minute in comparison to a bath temperature of 75° C. for thirty seconds in the leaching bath of hydrochloric acid which is portrayed by curve C in FIG. 2.

Figure 3:
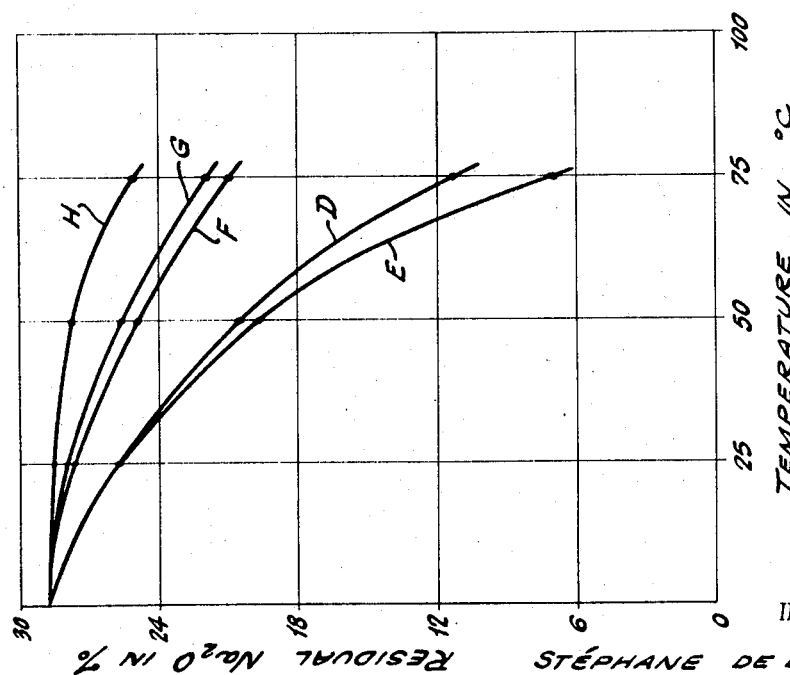

FIG. 3 portrays the results of tests made on ten micron fibers obtained with the same glass, and shows the effects of the bath temperature on the percentage of residual $Na_2O$, the de-alkalinization treatment being made in thirty seconds. Curve D refers to a deci-normal concentration of hydrochloric acid, and curve E to a normal concentration of hydrochloric acid. On this same figure are represented curves showing percentages of residual $Na_2O$ for different bath treatments. Curve F shows the residual $Na_2O$ upon treatment in an aqueous bath of hydrochloric acid of 0.01 N concentration. Curve G shows the residual $Na_2O$ when the treating bath is water, and curve H when the treating bath is a 0.01 N solution of potassium hydroxide (KOH). These curves demonstrate clearly the speed of de-alkalinization with near normal concentrations of hydrochloric acid. It is also seen that de-alkalinization by water is extremely weak.

Figure 5:
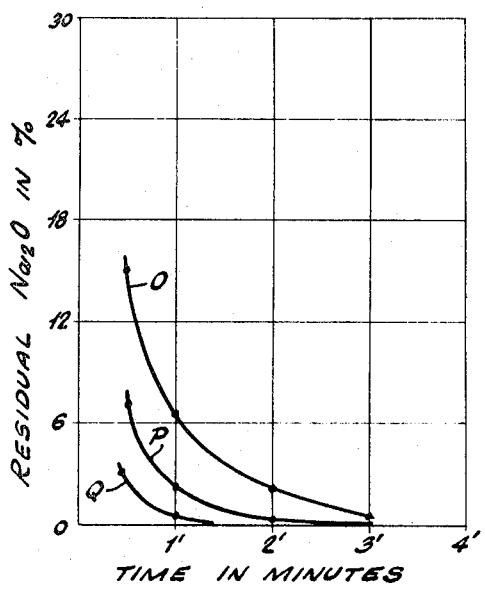
Figure 4:
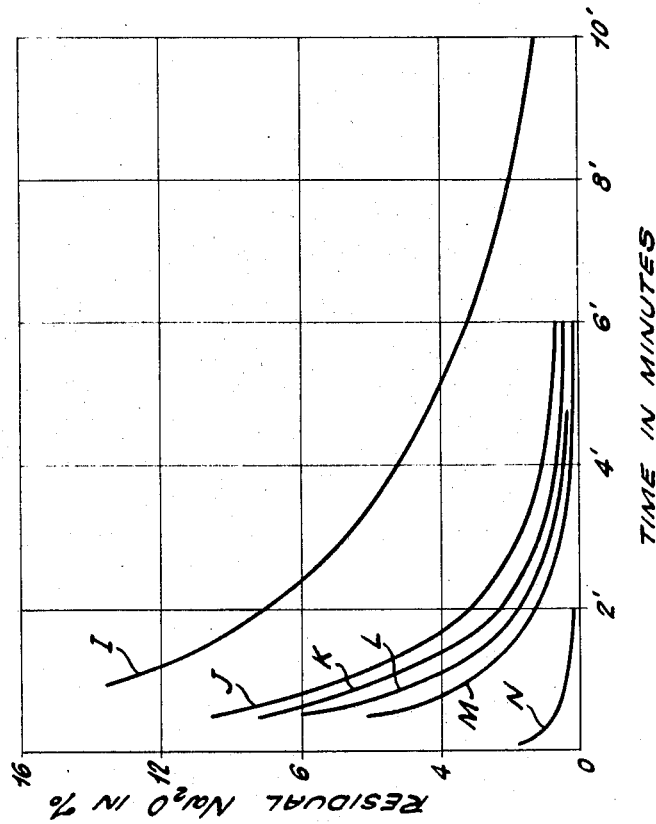

FIGS. 4 and 5 indicate the effect of the composition of the glass on the de-alkalinization time of ten micron diameter fibers.

The curves of FIG. 4 were obtained with a boiling normal aqueous solution of hydrochloric acid and portray, respectively, tests obtained on different glass fibers having the following different initial contents of $Na_2O$:

|  | Percent |
|---|---|
| Curve I | 20.6 |
| Curve J | 22.4 |
| Curve K | 22.9 |
| Curve L | 24.4 |
| Curve M | 25.7 |
| Curve N | 27.9 |

It can be seen that the speed of de-alkalinization increases very rapidly with the increase in $Na_2O$ content.

The curves of FIG. 5 are on an enlarged scale relative to those shown in FIG. 4, and were obtained with a normal aqueous solution of hydrochloric acid at 75° C. and portray, respectively, tests obtained on different glass fibers having the following different initial contents of $Na_2O$:

|  | Percent |
|---|---|
| Curve O | 27 |
| Curve P | 29 |
| Curve Q | 31 |

The test results portrayed in the preceding figures indicate clearly that the most favorable and most economical conditions for obtaining rapid de-alkalinization of glass fibers made of the indicated glass ingredients and containing particularly 29% to 31% $Na_2O$, consist in utilizing an acid concentration of about 1 N and which may be lower, without however going below 0.2 N, this acid treatment being executed at a temperature of about 75° C. to 100° C.

Besides the possibility of obtaining practically complete de-alkalinization after a very reduced treatment period, which may be about one minute, the process according to the invention is also advantageous in the sense that it permits putting into play reasonable quantities of acid with respect to the quantity of fibers to be treated, taking into account that the mass of fibers is very small compared to the quantity of liquid necessary to assure immersion of a given mass of fibers.

In the case of continuous manufacture particularly, it is appropriate to see to it that after passage of alkaline ingredients of the glass in solution, the leaching bath does not become neutralized or slightly alkaline, a fact which might slow down considerably the speed of de-alkalinization. To avoid this risk, a particularly effective process, appilcable to industrial de-alkalinization of continuous fibers, consists in passing, in a direction opposite to the flow of the mat of fibers, an aqueous current, into which has been introduced at different points, the quantity of acid which is necessary to maintain the bath treatment at a concentration at least equal to 0.2 N and which may go as high as normal. Within this range of concentration it will, of course, be advantageous to maintain the weakest concentration since they are the most economical.

Figure 6:
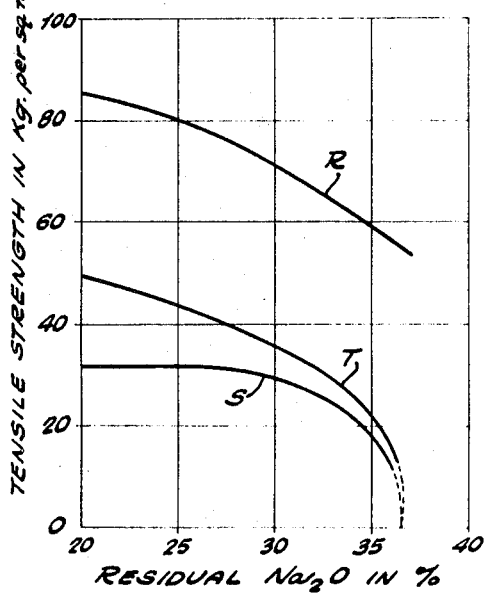

The curves of FIG. 6 show how the tensile strength varies as a function of the $Na_2O$ content. Curve R refers to the initial fibers, that is, before treatment; curve S refers to fibers de-alkalinized by treatment with a decinormal solution of hydrochloric acid solution; and curve T is a record of fibers de-alkalinized and calcined at 800° C.

It is seen that acid treatment decreases the strength of the fibers but this strength remains substantially constant and sufficient as long as the $Na_2O$ content does not exceed 34%. By limiting this initial $Na_2O$ content to 31%, sufficient mechanical strength is assured, while at the same time realizing an almost total de-alkalinization in a very brief time by means of a glass capable of being transformed into fibers under good fabricating conditions. It will also be noted that the final calcination treatment results in an appreciable raising of the tensile strength.

FIG. 7 shows, by way of example, an installation for executing the process of the invention.

In this figure is shown the fiber producing apparatus which may consist of a rotating body 1 with a peripheral band or wall 2 provided with orifices through which the melted glass is projected in fine filaments under the action of centrifugal force. These filaments are drawn out into fine fibers by means of gas jets escaping from orifices 3 of a blower crown 4. These fibers are received on a conveyor 5 passing over an exhaust hood 6. The mat or pad of fibers 7 thus formed is carried by endless conveyor 5 into the tank or vat 8 where it is plunged into the acid bath of suitable concentration, assuring de-alkalinization of the fibers. This vat is heated to a suitable temperature between 75° C. and 100° C. After this leaching bath, the mat of fibers passes into the water washing tank 9 whence it is introduced into the oven 10 where it is dried and subjected to a heat treatment, assuring the calcination of the fibers.

The production of fibers may be obtained by means of any other suitable apparatus. For example, an apparatus such as that shown schematically in FIG. 8 may be utilized. This apparatus comprises a spinnert 11 producing threads or filaments 12 which are drawn out by rollers 13 and then transformed into fibers by fiberizing members 14.

A fiber-producing apparatus such as shown schematically in FIG. 9 may also be utilized. In this arrangement, the filaments leaving spinning nozzle 15 are drawn out into fibers by gaseous currents acting at the exit of the spinning nozzle, which fibers are then deposited on the endless conveyor 5.

FIG. 10 illustrates graphically the results of including varying percentages of cobalt oxide in the glass composition, which are plotted as abscissas. The ordinates represent the tractive resistance of the fibers plotted against different percentages of cobalt oxide in the initial glass composition. The ordinates represent the temperature at which a skein or bundle of fibers ruptures when it is subjected to a traction of 110 grams per square millimeter.

Similarly, FIG. 11 represents graphically the results of the inclusion of varying amounts of the oxide of chromium $Cr_2O_3$ on the tractive resistance of the resulting fibers.

FIGS. 14 to 16, like FIGS. 10 and 11, portray the special advantages resulting from the inclusion of predetermined amounts of stabilizing metallic oxides in the glass compositions, by increasing the integrity and resistance to tractive pull when the fibers are subjected to high temperatures. Thus, the addition of the oxide of magnesium in amounts of 0.50 to 3.0% results in maximum resistance to rupture at temperatures exceeding 1300° C. This is portrayed by the curve shown in FIG. 14. Similarly, the curve shown in FIG. 15 indicates that resistance to rupture at this approximate temperature may be attained by the addition of 0.20 to 2.25% of the oxide of manganese, $Mn_2O_3$. Likewise, the addition of the oxide of $Bi_2O_3$ in amounts ranging from 0.20 to 2%, results in fibers capable of resisting temperatures between approximately 1250 and 1350° C. before rupture. This is illustrated by the curve shown in FIG. 16.

Following are examples of several modes of execution of the invention:

EXAMPLE I

A glass composition of the following percentages by weight was melted:

$Na_2O$, 29%, SiO (70.72—$x$)%, and $Cr_2O_3$ $x$%, (where $x$ may range from 0.10% to 3%), and different impurities amount to 0.28%. The molten composition was transformed to fibers having an average diameter of 8 microns by mechanical drawing out, leached in an aqueous boiling solution of hydrochloric acid of .6 N strength for three minutes, rinsed in boiling water for one minute, and dried in an oven at 160° for twelve hours.

Tractive resistance tests at high temperature were made on skeins of fibers thus treated. FIG. 11 shows the tractive resistance of the fibers as a function of the chrome oxide content in the initial glass composition. As evident by the curve, maximum tractive resistance is attained with a content of 2%.

Beyond 5% of $Cr_2O_3$ the glass devitrifies and can no longer be fiberized.

EXAMPLE II

A glass composition of the following percentages by weight was melted:

$Na_2O$, 29%, $SiO_2$, 68.2%, CoO, 2.5%, with impurities amounting to 0.3%. The molten composition was centrifuged to form fibers and leached in the form of a continuous guided mat. The leaching was executed in one minute by passage of the mat through a 1.2 normal solution of sulfuric acid at 95° C. with 2% of a wetting agent. The product was then washed for one minute in cold water in order to eliminate the remaining traces of acid and salt which was formed, dried at 400° C., and then treated at 900° C. to eliminate all water and obstructions from the micropores due to leaching, this being the usual technique in obtaining pure silica through leaching.

The final product contained: $SiO_2$, 96.8%, $Na_2O$, 0.03%, CoO, 3.0%, and impurities about 0.2%.

FIG. 10 indicates maximum resistance to a tractive pulling force with a composition having an addition of approximately 2% to 4% of CoO.

FIG. 12 shows the comparative curves of heat resistance of mats of silica fibers obtained by leaching under similar conditions, curve A representing a silica fiber of 99.9% $SiO_2$, derived from a silicate of soda with 29% $Na_2O$, and curve B representing the above product.

The test consists in subjecting a specimen of a mat maintained at a pressure of 100 kg./m.² to a rise in temperature of 5° C. per minute. Crushing or loss in thickness is noted in percentages as ordinates as a function of temperature of the mat, noted as abscissas. It is seen that the gain in heat resistance is about 130° C. for a crushing range between 5% to 15%. Likewise, the incidence of the crushing or loss in thickness is delayed for approximately 130° C.

EXAMPLE III

A silicate of the following composition by weight was melted:

$Na_2O$, 31.5%, $SiO_2$, 66.3%, $Cr_2O_3$, 2%, and impurities 0.2%. The molten composition was then fiberized by a centrifuging process and the resulting fibers, laid up in the form of a mat, were leached for 32 seconds in a 1.2 normal solution of sulfuric acid with 2% of a wetting agent, at 95° C.

The washing and drying operations were identical to those practiced in the case of Example II, and the terminal heat treatment was executed at 1100° C.

The final product contained: $SiO_2$, 97.10%, $Na_2O$, 0.20%, $Cr_2O_3$, 2.53%, and impurities about 0.17%.

FIG. 13 shows the comparative heat resistance curves of the above product, indicated by curve D, and of silica fibers indicated by curve C obtained by leaching with a soda content of 0.15%, which renders it slightly weaker.

Here the gain in heat resistance is about 190° to 200° for a crushing of 5% to 15%, and of 170° for the beginning of crushing.

Also, $Na_2O$ and/or $K_2O$ may be replaced molecularly by the oxide of lithium up to a concentration of 5% by weight, and preferably 0.2% to 2% by weight. Thus, a final product with improved thermal properties is obtained.

The specific examples of glass compositions set forth above, as well as the several graphs showing the results of the addition of slight amounts of stabilizing metallic oxides, establish clearly the commercial advantages attainable by the use of such compositions, which make possible the drawing out of fibers produced therefrom at relatively low temperatures without devitrification, the capability of the rapid leaching thereof to adapt the process to continuous manufacture with economical consumption of acid chemicals, and the high quality of the resultant fibers which adapt them especially to high-temperature resistant uses.

We claim:

1. The method of continuous monufacture of a mat of glass fibers composed essentially of silica which comprises forming a mat by depositing a mass of fibers of diameters ranging from one to ten microns, in raw and attenuated form, onto a travelling support, said fibers being composed initially of silica from 66% to 73% and alkali oxides from 34% to 27% selected from the group consisting of sodium oxide, potassium oxide and lithium oxide, with less than 5% of stabilizing metallic oxides of the divalent and trivalent groups, heating said mat in an aqueous bath of a mineral acid selected from the group consisting of hydrochloric acid and sulfuric acid, at a temperature ranging from substantially 75° C. to 100° C., and of a concentration ranging from substantially 0.2 to 1.3 normal strength, during the passage of said mat through said bath for a period of substantially one-half minute to three minutes, to leach out the alkali oxides from the fibers to a remanent amount of substantially less than 0.5% in weight, and washing the mat of fibers in an aqueous bath, said stabilizing metallic oxides of the divalent and trivalent gorups being selected from the following in the respective proportions:

$Bi_2O_3$—0.20 to 2%, and preferably 0.50 to 1%
CoO—0.50 to 5%, and preferably 2 to 5%
$Cr_2$—0.10 to 3%, and preferably 1.25 to 2.75%
MgO—0.50 to 3%, and preferably 0.50 to 2.50%
$Mn_2O_3$—0.20 to 2.25%, and preferably 0.50 to 2%.

2. The method set forth in claim 1, including the subsequent step of calcining the mat of fibers to eliminate the water absorbed by the fibers during treatment.

3. The method set forth in claim 2 wherein the last-mentioned calcining step is executed at a temperature ranging from 600° C. to 1200° C.

4. The method set forth in claim 1 wherein the molecular ratio of silica to the alkali oxide ranges between 2 and 3.

5. The method set forth in claim 4 wherein the molecular ratio of silica to the alkali oxide ranges between 2.3 and 2.5.

6. The method set forth in claim 1, wherein the glass fibers are produced from a glass composition containing 29% to 31% $Na_2O$ and 71% to 69% $SiO_2$.

7. An article produced by the method set forth in claim 1.

8. An article produced by the method set forth in claim 2.

References Cited

UNITED STATES PATENTS

| | | | |
|---|---|---|---|
| 2,843,461 | 7/1958 | Labino | 156—24 |
| 2,978,341 | 4/1961 | Bastain | 106—50 |
| 3,007,806 | 11/1961 | Hartwig | 106—50 |
| 3,012,930 | 12/1961 | Labino | 156—24 |
| 3,092,531 | 6/1963 | Labino | 65—31 |
| 3,374,141 | 3/1968 | Junge et al. | 156—124X |

S. LEON BASHORE, Primary Examiner

R. L. LINDSAY, JR., Assistant Examiner

U.S. Cl. X.R.

65—30, 31; 106—50, 52, 66; 156—24; 161—169

PO-1050
(5/69)

UNITED STATES PATENT OFFICE
CERTIFICATE OF CORRECTION

Patent No. 3,560,177           Dated February 2, 1971

Inventor(s) STEPHANE DeLAJARTE and JEAN ASOLO

It is certified that error appears in the above-identified patent and that said Letters Patent are hereby corrected as shown below:

Claim 1, column 7, line 47, "monufacture" should be --manufac-

Claim 1, column 8, line 13, "gorups" should be --groups--.

Claim 1, column 8, line 17, "$Cr_2$" should be --$Cr_2O_3$--.

Signed and sealed this 18th day of May 1971.

(SEAL)
Attest:

EDWARD M. FLETCHER, JR.           WILLIAM E. SCHUYLER,
Attesting Officer                 Commissioner of Pater